United States Patent [19]

Richard

[11] Patent Number: 4,599,001

[45] Date of Patent: Jul. 8, 1986

[54] MULTISPECTRAL LINEAR ARRAY MULTIBAND SELECTION DEVICE

[75] Inventor: Herbert L. Richard, Crofton, Md.

[73] Assignee: The United States of America as represented by the Administrator of the National Aeronautics and Space Administration, Washington, D.C.

[21] Appl. No.: 606,426

[22] Filed: May 2, 1984

[51] Int. Cl.⁴ .................................................. G01J 3/51
[52] U.S. Cl. ..................................... 356/419; 356/402; 350/315; 350/318
[58] Field of Search ................. 356/51, 402, 416, 419, 356/414, 417; 350/172, 315, 317, 318; 250/226

[56] References Cited

U.S. PATENT DOCUMENTS

| | | | |
|---|---|---|---|
| 2,985,061 | 5/1961 | Krappatsch | 356/319 |
| 3,458,702 | 7/1969 | Dryden | 356/319 |
| 3,547,541 | 12/1970 | Varnela | 356/319 |
| 3,703,133 | 11/1972 | Yost, Jr. | 356/51 |
| 3,837,744 | 9/1974 | Egan et al. | 356/326 |
| 3,901,600 | 8/1975 | Johnson, Jr. et al. | 356/319 |
| 4,027,974 | 6/1977 | Bumgardner | 356/407 |
| 4,342,516 | 8/1982 | Chamran et al. | 356/334 |
| 4,396,288 | 8/1983 | Helphrey | 356/418 |
| 4,444,472 | 4/1984 | Tanaka | 350/172 |
| 4,519,707 | 5/1985 | Kuffer | 356/328 |

FOREIGN PATENT DOCUMENTS 0021526 2/1983 Japan ......................... 356/51

OTHER PUBLICATIONS

Baxter et al., *IBM Technical Disclosure Bulletin*, vol. 14, No. 8, Jan. 1972, p. 2410.

*Primary Examiner*—F. L. Evans
*Assistant Examiner*—Joel L. Harringa
*Attorney, Agent, or Firm*—John O. Tresansky; John R. Manning; Harry Lupuloff

[57] ABSTRACT

Apparatus for detecting multiple spectral bands, individually or concurrently, using linear detector arrays (30, 36). The system employs a beamsplitter (12) to divide the optical source (10) into two or more optical beams (24, 32), which beams are directed at the linear detector arrays (30, 36). Filter trays (38, 40) are positioned in the focal planes of the optical beams (24, 32) so that the beams pass through the filter trays prior to impinging upon the detector arrays (30, 36). Multiple filters (42, 44, 46, 48, 50, 52) are placed on the filter trays (38, 40). Linear actuators (62, 64) positioned adjacent the filter trays (38, 40) translate the trays across the focal planes of the optical beams (24, 32) so that individual filters are positioned in the path of beams, such that those frequencies of the beams that fall within the spectral ranges of the individual bandpass filter through which it passes may be detected by the detector arrays for further examination and analysis.

8 Claims, 6 Drawing Figures

MULTISPECTRAL LINEAR ARRAY MULTIBAND SELECTION DEVICE

ORIGIN OF THE INVENTION

The invention described herein was made by an employee of the U.S. Government and may be manufactured and used by or for the Government for Governmental purposes without the payment of any royalties thereon or therefor.

TECHNICAL FIELD

The invention relates generally to optical detection devices and more particularly to an instrument for selectively detecting multiple spectral bands of an optical beam.

BACKGROUND ART

In the field of electro-optics, systems exist which employ devices for discerning the wavelength of received radiant energy. For example, a source of optical radiant energy, such as earth reflected sunlight may provide a beam that can be used for discerning characteristics of the earth's radiant source. In most receiver systems compatible with such a source, it is desirable to determine the characteristics of the beam such as the spectral content and associated signal strength.

Many optical systems are adapted to perform this detection analysis by utilizing optical filters positioned in the optical path. In this way, the spectral bands of interest may be further analyzed with detection devices such as a photomultiplier tube or solid state detector.

Earth imaging from space by sensors has provided scientists and engineers with new means and insight for determining the magnitude and extent of earth resources. Investigations have proven the value of this data in many fields of interest such as geology, oil and mineral exploration, biomass distribution, forestry, agriculture, and urban and rural development. Researchers involved in the study and application of data in these fields have a need for finer spatial and spectral resolutions and for additional spectral bands.

Analysis of earth imagery from both spaceborne and aircraft instruments has underscored the usefulness of an earth imaging instrument that offers a multiplicity of spectral bands with finer spatial resolution. As many as 12 bands in the Visible-Near (infrared) (VIR/NIR, 0.4–1.0 m), 12 bands in the Short Wave IR (SWIR, 1.0–2.5 m), and a spatial sharpening band are desired.

This desire for analyzing a multiplicity of bands has led to a consideration of various spectrally dispersive instrument designs to provide the desired capability. Prior systems achieved spectral band selection by numerous techniques such as fixed position filters, filters directly deposited on the detectors, a movable filter wheel or tray, and the use of a spectrometer or an interferometric device.

The prior art systems were deficient in several respects. For example, the fixed position filters and filters mounted on the detectors are limited in number of filter/detector combinations that could be accommodated in the instrument focal plane. The movable wheels or trays are large and the use of several of these devices in a focal plane to provide simultaneous readout of several bands is extremely difficult. The use of a spectrometer to provide a continuum of bands is wasteful of the incoming energy because of the inefficiency of the grating or prism spectral dispensing element, and because some of the energy falls within bands of no scientific interest. Furthermore, band selectivity requires an area detector array of large size which is difficult to fabricate and cool, and to obtain uniformity of response further complicates the associated signal processing. An interferometric device, such as the Fabry-Perot interferometer, can provide selection of spectral bands but only one band at a time, and to place several of these devices in a focal plane for simultaneous band selection at different wavelengths is impracticable.

STATEMENT OF THE INVENTION

Accordingly, it is an object of the invention to provide a system capable of simultaneously detecting multiple spectral bands.

Another object of the invention is to provide a system for selecting particular frequency bands of an incident beam of optical radiation.

Yet another object of the invention is to provide a device for sensing energy in multiple selected bands with a single detector array.

Still another object of the invention is to provide a device having a high degree of spatial coregistration between optical detectors.

A further object of the invention is to provide an efficient, accurate, compact and inexpensive multispectral linear array instrument system.

A still further object of the invention is to provide a multispectral detection system for earth imaging and space astronomy.

Another object of the invention is to provide a linear array remote sensing instrument exhibiting increased spectral-band flexibility.

These and other objects are attained by a multiband selection device wherein a beam splitter provides two or more optical beams from a source, respective movable filter trays each providing filters for sensing a series of different spectral bands that can be sensed by respective fixed detector arrays in the path of the beams. The filter trays are moved by respective linear actuators to selectively place different filters in the paths of the split optical beams, thereby enabling selection of different multiband spatial band combinations.

The foregoing as well as other objects, features and advantages of the invention will become apparent from the following detailed description when taken in conjunction with the appended drawings.

DETAILED DESCRIPTION OF THE INVENTION

Figure 1:
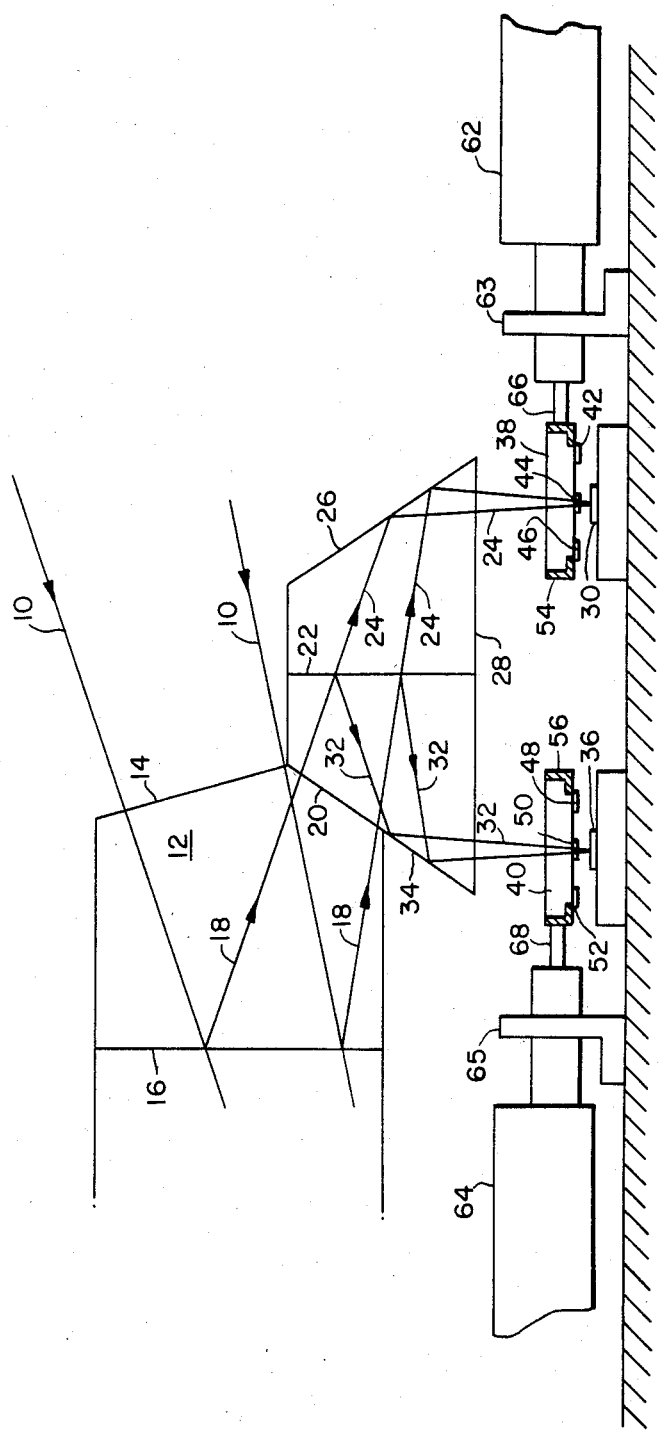
FIG. 1 is a side elevational view of a multiband selection device embodying the invention.
Figure 2:
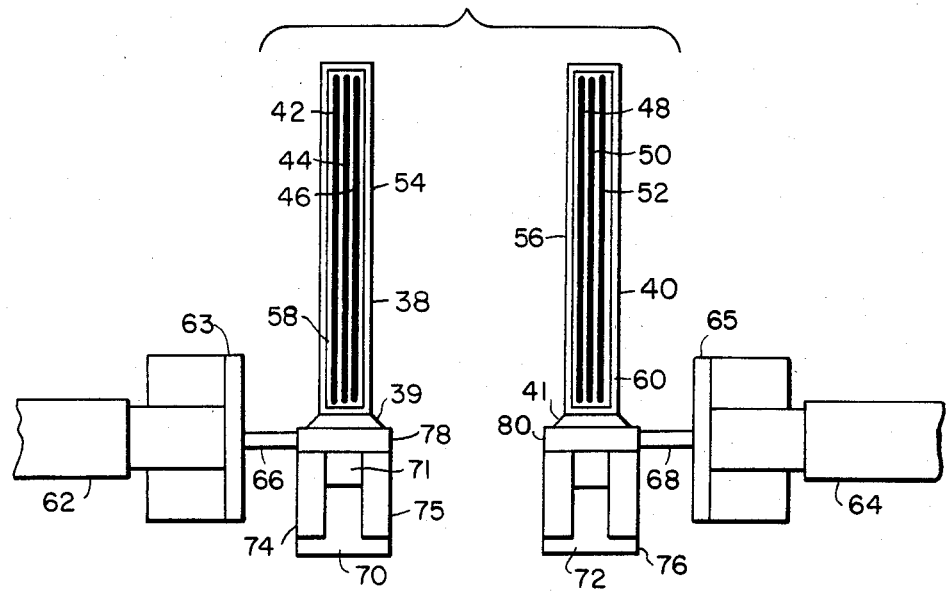
FIG. 2 is a top plan view of the filter trays, linear actuators and their coupling of the present invention.

Referring now to the drawings wherein like reference numerals designate like parts throughout the several views, FIGS. 1 and 2 illustrate, in schematic form, the multiband selection device, when used in conjunction with a beamsplitter, according to the preferred embodiment of the invention. A source of optical radiation (not shown) provides a light beam 10 as might be provided by a telescope. A beamsplitter 12 is positioned in the path of beam 10 such that the beam enters the beamsplitter at a transmissive face 14, preferably perpendicular to beam 10, and impinges upon a dichroic interior surface 16 which separates the light impinging thereupon into different spectral regions and transmits the separated light to other parts of the beamsplitter. The amount and nature of the dichroic coating applied to surface 16 is dependent upon the nature of the bandpasses of the beam desired to be analyzed.

A beam 18 encompassing one spectral region is reflected off surface 16 and passes through another transmissive surface 20 to impinge upon another dichroic interior surface 22. A beam 24 is transmitted through surface 22 and is internally reflected off a reflective surface 26 to egress beamsplitter 12 at a transmissive exit face 28 whereupon it strikes a longitudinal linear detector array 30. Similarly, a beam 32 is reflected from dichroic surface 22 and is internally reflected off another reflective surface 34 to egress the beamsplitter 12 at exit face 28 whereupon it strikes another longitudinal linear detector array 36. Linear detector arrays 30 and 36 are conventional single line array type as, for example, manufactured by Reticon, Inc. EG&G, and Thomson-CCF, whose outputs are typically coupled to a conventional signal processor through a charge coupled device, CCD, not shown.

A movable filter tray 38 is interposed between exit face 28 and detector array 30 to intercept beam 24 passing therebetween. In like manner, a movable elongated filter tray 40 is interposed between exit face 28 and detector array 36 to intercept beam 32 passing therebetween. As more clearly shown in FIG. 2, filter tray 38 and 40 are formed of elongated stainless steel frames 54 ad 56 having center openings. Transmissive glass substrates 58 and 60, conforming in shape to the dimensions of the openings, are respectively mounted in the openings by bonding or by employing spring clamps.

As will be discussed hereinafter, a linear actuator 62, supported above a supporting surface by bracket 63 operates to selectively position tray 38 over detector array 30. Likewise, a linear actuator 64, supported above the surface by bracket 65 operates to selectively position tray 40 over detector array 36.

Filter trays 38 and 40 are aligned with detectors 30 and 36, respectively, such that only glass substrates 58 and 60, respectively, are in the paths of beams 24 and 32, respectively, prior to their impingement upon linear detector arrays 30 and 36, respectively. Filter trays 38 and 40 terminate with integral flange members 39 and 41, respectively. Flange members 39 and 41 are secured to rectangularly shaped filter support members 78 and 80, respectively.

Positioned on each of the glass substrates 58 and 60 along the lengths thereof, are a plurality of conventional bandpass filters, such, for example, as three per tray, i.e., 42, 44, 46 and 48, 50, 52, respectively. Each filter is arranged to have the same general dimensions but slightly wider and longer than the dimensions of detector arrays 30 and 36 which they overlie. Filters 42-52 may be placed on their respective glass substrates in any of several conventional techniques, such as by vapor deposition, or by bonding the filter material to the substrate.

Figure 3:
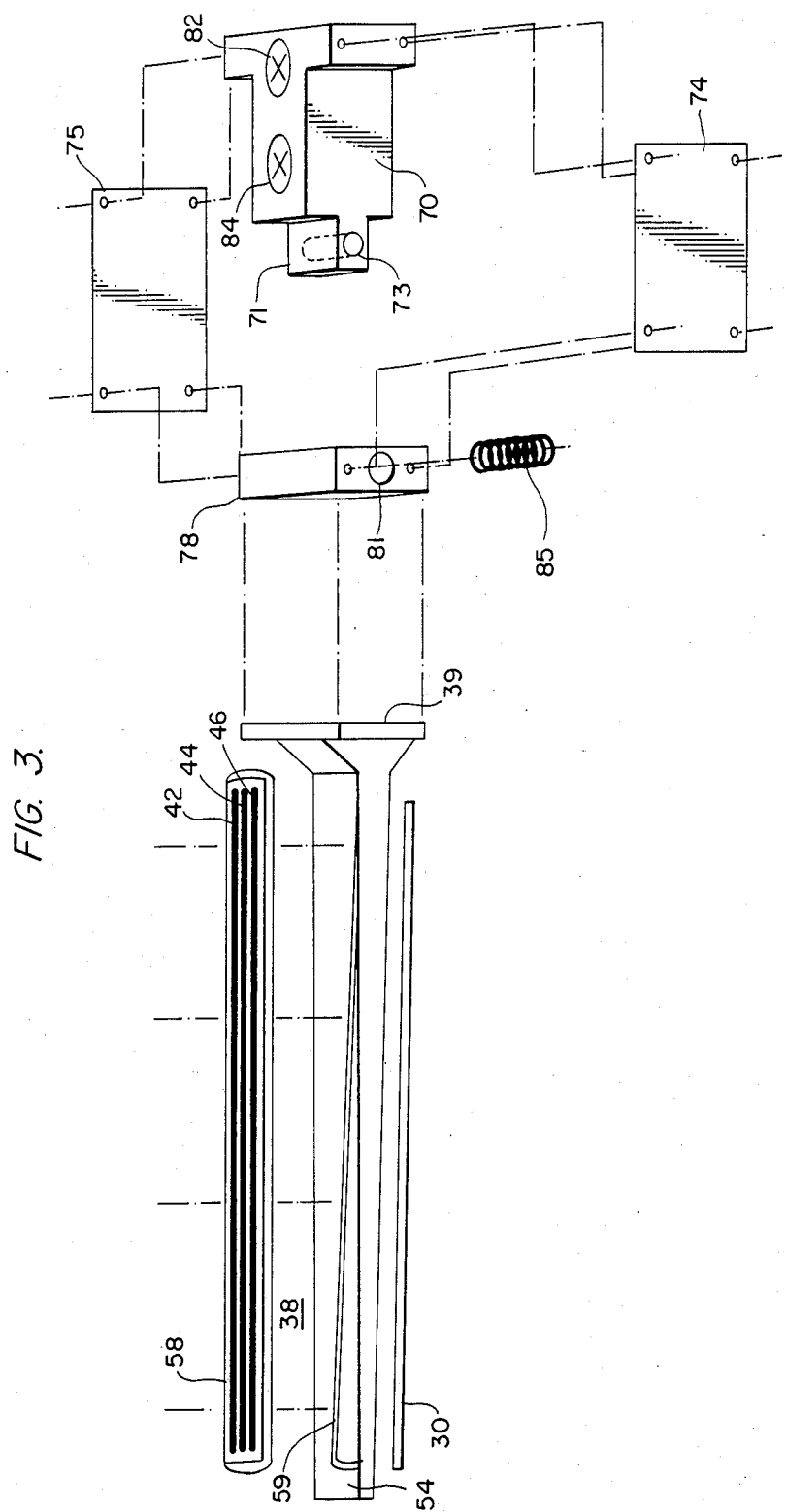
FIG. 3 is a partially exploded view of the filter tray and the coupling member moving it of the present invention.

The interface coupling filter tray 38 to linear actuator 62 is best understood by referring to FIG. 3, and it should be understood that a similar interface is utilized between filter tray 40 and linear actuator 64. A T-shaped base mount 70 is fixedly secured to the supporting surface by conventional devices, such as screws 82, 84. The leg portion of the base mount is along the longitudinal axis of detector 30. The thickness of the leg portion of the mount is reduced near the extremity thereof to form a projection 71. The projection has an aperture 73 therein perpendicular to the longitudinal axis of the leg and running from one side of the leg partially therethrough. Filter support member 78 has a center opening therethrough, and is provided with a circular aperture 81 in one side thereof running therethrough, the axis of which is perpendicular to the longitudinal axis of the detector array. A pair of rectangular shaped flexible plates 74 and 75 are secured, by screws, to opposite side walls of base mount 70 and filter support member 78 such that support member 78 and filter tray 38 connected thereto are suspended above the supporting surface. The dimensions of base mount 70 are such that when clamped to filter support member 78, projection 71 is disposed within the center opening of support member 78 and apertures 73 and 81 are adjacent and aligned.

Prior to securing plate 74 between base mount 70 and filter support 78, a coil spring 85 is positioned in apertures 81 and 73 so as to be compressed within projection 71. Spring 85 normally urges plate 74 and, therefore, filter support member 78 and filter tray 38 in the direction of plate 74. As is evident from the cooperative relationship of the above elements, they form a flexure equivalent of a parallelogram-type four bar linkage with plates 74 and 75 assuming identical shapes to always maintain filter tray 38 parallel to detector array 30 as it is moved thereacross.

Referring back to FIG. 2, linear actuator 62 which may be a micrometer with a constant drive or digital step motor, having tip 66, is positioned such that the tip perpendicularly contacts plate 74 at the point of aperture 81 to act against the urgings of the spring compressed within projection 71. With the movement of tip 66 by linear actuator 62, filter tray 38 is incrementally translated across detector array 30, thereby enabling filters 42, 44 and 46 to remain parallel to the array. Linear actuator 64, with tip 68, operates in similar fashion upon a plate 76 to translate filter tray 40 across detector array 36.

Figure 4A:
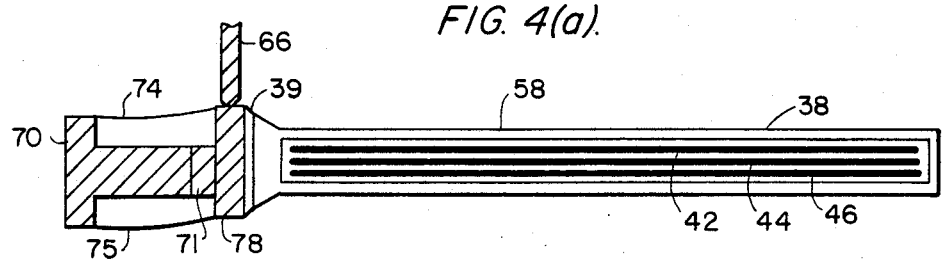
FIG. 4(a)–4(c) are schematic views of the various positions of the filter tray according to the invention.
Figure 4B:
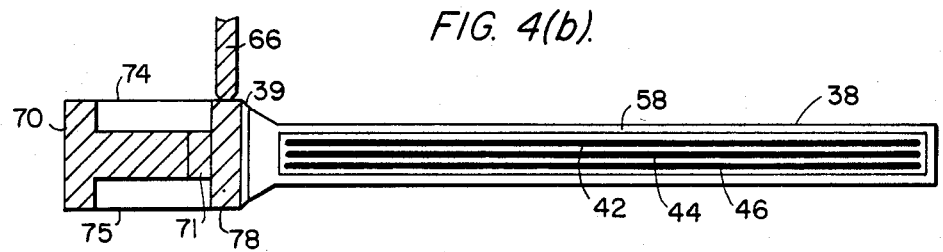
Figure 4C:
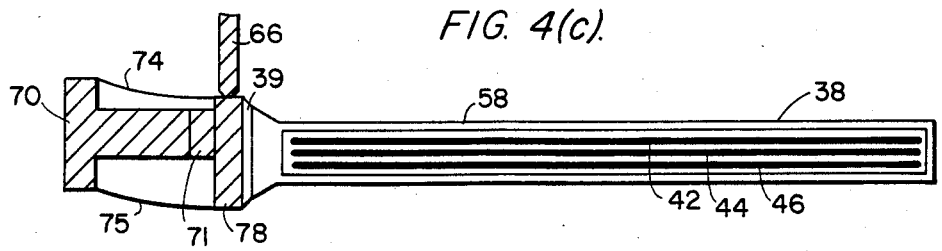

Prior to usage, linear actuator 62 is calibrated so that each of filters 46, 44, 42 can be successively positioned in the focal plane of beam 24 prior to its impingement upon detector array 30 as shown in FIGS. 4(a), 4(b), 4(c), respectively, and these positions recorded and stored for future usage. The linear actuator may have a positional read-out as part of the actuator such that the actuator may be commanded to drive to a given position in a closed-loop operation. Linear actuator 62 causes tip 66 to compress translate spring 85 and filter support member 78 to translate to position filter tray 54 such that a desired one of filters 42, 44, 46 will be aligned in the path of beam 24. As the filters move across array 30 they remain parallel to the longitudinal axis of the array. While only filter tray 38 is illustrated in FIGS. 3 and 4(a)-4(c), it should be understood that filter tray 40 is identical in both structure and operation.

Filters 42, 44, 46, 48, 50 and 52 have different bandpass characteristics from one another, enabling different frequencies of beam 10 to be selectively examined depending on the specific filters placed in the paths of beams 24 and 32 split out therefrom. Linear actuators 62 and 64, which are operated independently from one another, separately control the positioning of filter trays 38 and 40, respectively, enabling multiple spectral bands to be selected for analysis. For example, if each of filter tray 38 and 40 has three filters thereon, nine different band combinations are available for simultaneous detection.

Thus, what has been shown and described is a relatively simple multiband selection device that enables multiple bands in the visible short infrared bands and thermal IR bands to be selected and the energy in the selected bands to be sensed by a single detector array. Several devices may be located side-by-side in close proximity at the exit face of a beam splitter, providing a high degree of spatial coregistration. The invention may be advantageously employed on remote sending instruments such as space astronomy, earth imaging systems, industrial and medical spectroscopy and thermal process controls.

Having thus disclosed the preferred embodiment of the invention, it should be understood that the same has been provided by way of explanation and not of limitation. The embodiment may be modified in several areas without departing from the scope of the invention. For example, the number of filters deposited on each tray may be varied and need not be limited to three per tray, subject to the width of the tray and the linear detector array. If detection of more spectral bands is desired and more concurrent analysis required, additional linear actuator controlled filter trays or tray pairs with appropriate bandpass filters and respective linear detector arrays may be positioned in the focal plane of the beam, or beams divided therefrom, which is transmitted through dichroic surface 16 of beamsplitter 12. The number of beam splits possible is limited only by the restricted amount of space available for the beamsplitter and the possible loss of energy in each split. A four-way beamsplitter can provide a choice of 81 different spectral band combinations if three filters per tray are employed.

If the number of filters on the two filter trays suffice, the beamsplitter may be readily arranged such that beam 10 directly impinges upon surface 22, reducing the complexity of the beamsplitter. Furthermore, if the number of spectral bands to be analyzed is limited to the number of filters capable of being placed on a single filter tray, the beamsplitter need not be utilized and the incoming beam maybe directly focused at the linear detector array. Neutral density filters may be used in place of the spectral filters or polarizing material employed if polarization is desired to be measured. A ledge or taper 59, as best illustrated in FIG. 3, may be advantageously employed in frame 54 to further support glass substrate 58. The transmissive glass substrates may be coupled directly to the filter tray support member, removing the stainless steel support. Piezoelectric actuators may be employed as well as stepper motors. Mounting of the actuators and their interfaces with the filter trays may assume many different configurations so long as the incremental movement of the filter tray is precise and remains parallel to the length of the detector array. Accordingly, all modifications, alterations and changes coming within the spirit and scope of the invention as set forth in the appended claims are meant to be included.

I claim:

1. Apparatus for selecting multiple spectral bands of an optical beam comprising:
    means for providing a selected number of one or more composite beams of an optical beam, each of which composite beams being composed of a plurality of diverse spectral bands;
    a fixed elongate detector array individually positioned in the path of an impinging one of each of said composite beams;
    a tray proximately overlaying each fixed detector array and carrying a plurality of elongate filters with diverse bandpass characteristics which are unique to each tray, each tray being moveable across the composite beam impinging upon its associated fixed detector array;
    a pair of flexible members individual to each tray;
    a stationary base connected to each pair of flexible members such that a flexible, parallelogram-type four bar linkage is formed; and
    moving means individual to each tray for positioning a selected one of the plurality of elongate filters carried by the tray into the path of the composite beam impinging upon its associated fixed detector array, said selected one of said filters being axially aligned with said associated detector array.

2. Apparatus as recited in claim 1 wherein said moving means comprises:
    a resilient member in contact with the stationary base for urging the tray in a direction perpendicular to the longitudinal axis of the tray; and
    a moveable member for imparting lateral movement to the tray against the urging of the resilient member, which lateral movement is maintained perpendicular to the longitudinal axis of the tray by the flexuring of the pair of flexible members.

3. Apparatus as recited in claim 2, wherein each fixed detector array comprises a linear detector array, and wherein said providing means comprises a beamsplitter for dividing said optical beam into two or more composite beams.

4. Apparatus as recited in claim 2 wherein each filter tray comprises a frame having a central opening and a glass substrate mounted thereover, said filters supported on said glass substrate.

5. Apparatus as recited in claim 2 wherein said movable member comprises a linear actuator.

6. Apparatus as recited in claim 4, wherein at least three filters are supported on each glass substrate, each filter having dimensions slightly wider and longer than the linear detector which they overlie.

7. A multiband selection device for detecting selected bands of a source beam, comprising:
    a beamsplitter for dividing said source beam into at least two optical beams;
    respective fixed linear detector arrays positioned in the paths of said optical beams;
    respective elongated filter trays comprising a glass substrate mounted over a frame positioned in the path of said optical beams and overlying respective ones of said detector arrays, said filter trays movable through respective optical beams;
    a plurality of filters having unique bandpass characteristics supported by said glass substrates;
    respective linear actuators for moving respective filter trays across and parallel to the longitudinal axes of said detector arrays;
    interface means coupling said filter trays to respective linear actuators;
    whereby by moving said filter trays such that different filters individually overlie said detector arrays, multiple spectral bands of said source beam may be examined individually and concurrently.

8. A multiband selection device as recited in claim 7, whrein each of said interface means comprises:
- a fixedly secured T-shaped base mount, the leg portion thereof in the longitudinal axis of respective detector array;
- a rectangularly shaped movable filter tray support member having a center opening therethrough, said support member coupled to respective frames for supporting respective filter trays above respective linear detector array;
- a pair of oppositely faced rectangularly shaped flexible plates clamped between the top portion of said T-shaped base mount and said filter tray support member;
- the leg portion of said T-shaped base mount terminating in the center opening of said support member and having an aperture in one end thereof perpendicular to the longitudinal axis of said detector array, said aperture extending from one side and partially therethrough;
- the support member having an aperture through one leg thereof, the aperture having a diameter conforming to that of the aperture of said leg portion and aligned therewith;
- a coil spring retained in said leg portion aperture such that it extends through said leg portion aperture and through said support member aperture and contacts one of said flexible plates to urge said flexible plate, filter support member and other flexible plate in the direction of said one of said flexible plates;
- said first and second linear actuator having a tip positioned adjacent respective filter tray support members on the side having said aperture so as to enable said actuator to exert a force on respective tray support members against the action of said spring so as to translate the member and its respective filter tray coupled thereto across respective linear detector arrays.

* * * * *